June 27, 1967  W. F. DAVISON  3,328,583
OPTICAL RECEIVER FOR PHASE LOCKING TO A MICROWAVE SUBCARRIER
Filed March 18, 1963  8 Sheets-Sheet 1

INVENTOR
Walter F. Davison

BY Cecil L. Wood
ATTORNEY

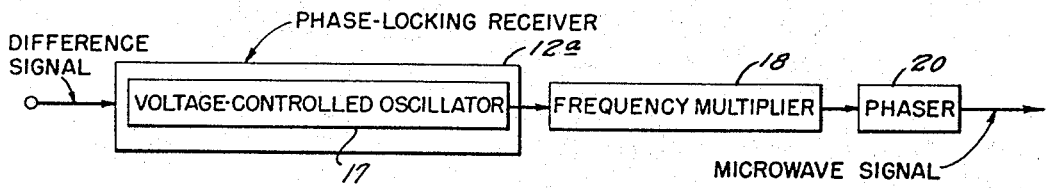
Fig. 4-A
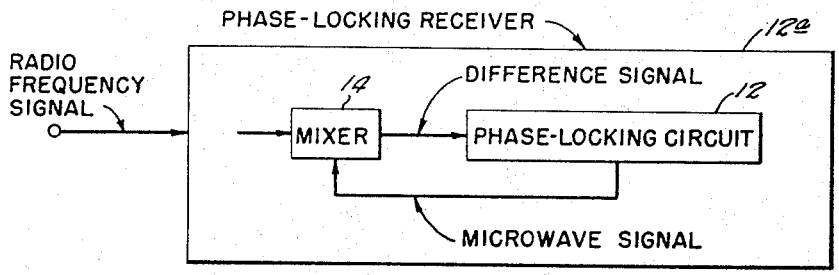
Fig. 5-A
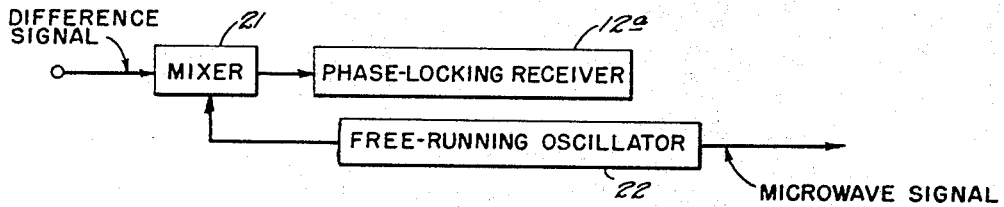
Fig. 5-B

June 27, 1967  W. F. DAVISON  3,328,583
OPTICAL RECEIVER FOR PHASE LOCKING TO A MICROWAVE SUBCARRIER
Filed March 18, 1963  8 Sheets-Sheet 4

INVENTOR
Walter F. Davison
BY Cecil L. Wood
ATTORNEY

June 27, 1967   W. F. DAVISON   3,328,583
OPTICAL RECEIVER FOR PHASE LOCKING TO A MICROWAVE SUBCARRIER
Filed March 18, 1963   8 Sheets-Sheet 5

INVENTOR
Walter F. Davison

BY *Cecil L. Wood*

ATTORNEY

June 27, 1967 W. F. DAVISON 3,328,583
OPTICAL RECEIVER FOR PHASE LOCKING TO A MICROWAVE SUBCARRIER
Filed March 18, 1963 8 Sheets-Sheet 6

INVENTOR
Walter F. Davison
BY
ATTORNEY

INVENTOR
Walter F. Davison

3,328,583
OPTICAL RECEIVER FOR PHASE LOCKING TO A MICROWAVE SUBCARRIER
Walter F. Davison, 3011-C Mahanna Springs Drive, Dallas, Tex. 75235
Filed Mar. 18, 1963, Ser. No. 265,949
3 Claims. (Cl. 250—199)

This invention relates to optical receivers and it has particular reference to means for phase-locking a local microwave oscillator to a microwave subcarrier which has been impressed on an optical carrier.

With the advent of the laser the field of optical communication is on the verge of a revolution by virtue of the output of a laser having very little angular spread, intense spectral density, and spectral purity approaching that of electromagnetic carriers familar to the radio region. The optical receiver designs of this invention are particularly suited to take fullest advantage of the properties of laser outputs, especially the feature of spectral purity. Nevertheless, the finite spectral width of a laser output must be taken into account in establishing means for optical reception, for the purest optical carrier as obtained from a gas laser may be several kilocycles in spectral width. Modulation placed on an optical carrier is subject to spectral degradation by the carrier's finite spectral width, if inappropriate means of reception are employed.

Information may be placed on an optical carrier by modulating it with one or more microwave subcarriers, each of which may in turn have been modulated, and in order best to extract this information it is necessary that demodulation at the optical receiver be accomplished in such a manner that the spectrally pure microwave subcarrier component be retrieved without spectral degradation, thereby allowing synchronous detection of the subcarrier by phase-locking methods. In like manner for asynchronous detection it is advantageous to retrieve the subcarrier without spectral degradation.

If the optical carrier is heterodyned with a local optical oscillator by means of a photodetector the mixing so achieved leads to the retrieval of the microwave subcarrier as a band of noise for the reasons that in modulating the optical carrier with a spectrally pure microwave subcarrier each of the resulting modulation sidebands have the spectral width of the optical carrier, which is finite, and each sideband, upon mixing in the photodetector with the statistically uncorrelated local optical oscillator, is further spectrally degraded with the spectral width being essentially determined by the convolution of the spectrum of the sideband with the spectrum of the local optical oscillator. Alternatively, if the optical carrier is homodyned with itself by means of a photodetector there arises the problem, for weak optical carriers, of the useful photodetector signal being submerged in photodetector noise and in noise from electronic components following the photodetector.

It is a prime object of the invention, therefore, to provide means for simultaneously mixing the optical carrier with itself and with a strong local optical oscillator to retrieve the microwave subcarrier and associated modulation without spectral degradation and to have a strong useful output for ameliorating photodetector and electronic noise.

Another and important object of the invention is that of providing means for mixing the microwave subcarrier on the optical carrier with a local microwave signal prior to or at photodetection so that the photodetectors of the optical receiver need only to pass low difference frequencies, thus surmounting the limited frequency response of photodetectors. The difference frequency is not generally chosen to be zero, for the related D.C. signal from the photodetector portion of the optical receiver would have superimposed thereon spectrally discrete D.C. contributions from the optical carrier per se, and from any external optical noise.

Having provided means for attaining a spectrally pure replica of the microwave subcarrier, a paramount and ultimate object of the invention is to phase lock the microwave subcarrier to a local oscillator.

A further object of the invention is that of providing means for asynchronously detecting the microwave subcarrier on the optical carrier as a spectrally pure signal at a low difference frequency.

Yet another object of the invention resides in the provision of means for asynchronously detecting the microwave subcarrier on the optical carrier as a spectrally pure signal at the microwave subcarrier frequency.

While the foregoing objects are paramount, other and lesser objects will become apparent as the description proceeds when considered with the appended drawings wherein:

FIGURE 1 is a diagrammatic illustration of the general phase-locking optical receiver, wherein an input comprising an optical carrier modulated with a microwave subcarrier is subjected to processing in an electro-optical processor to produce one or more optical beams, which in turn are processed by an optical-to-electric converter to produce an electrical difference signal, the last completing the locking loop by passage through a phase-locking circuit.

FIGURE 2 diagrammatically illustrates the general optical receiver for retrieving the microwave subcarrier as a spectrally discrete component at a low difference frequency.

Figure 1:
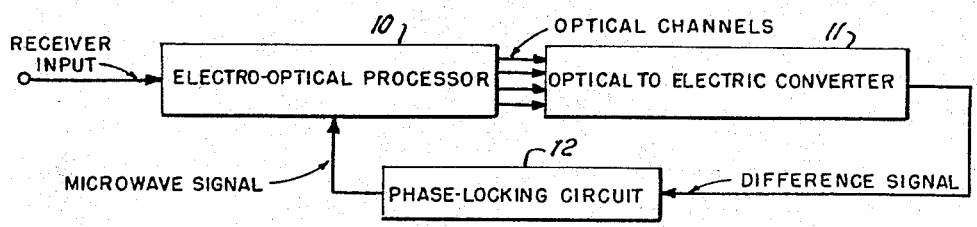
Figure 5:
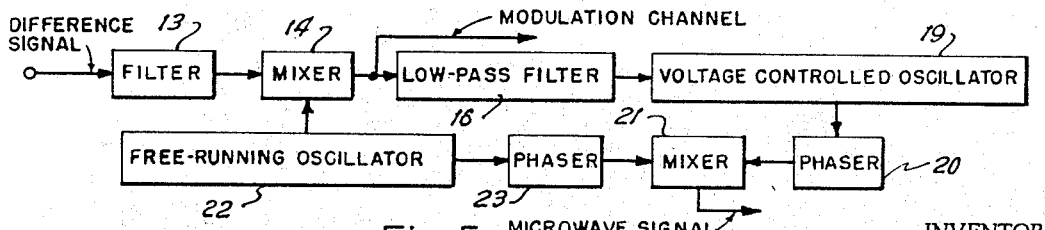

FIGURE 5 diagrammatically illustrates a second specific realization of the phase-locking circuit included in the receiver shown in FIGURE 1.

FIGURES 4A, 5A, and 5B illustrate phase-locking circuits obtained by modifying phase-locking radio receivers.

Figure 6:
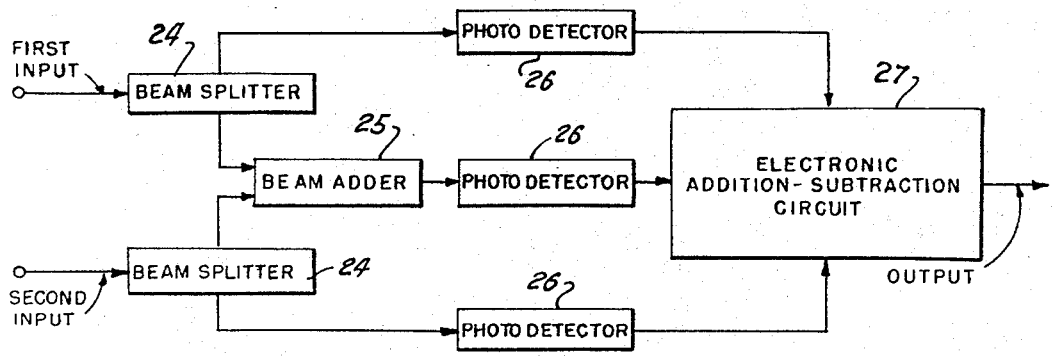

FIGURE 6 is a diagrammatic illustration of a specific optical product detector.

Figure 7:
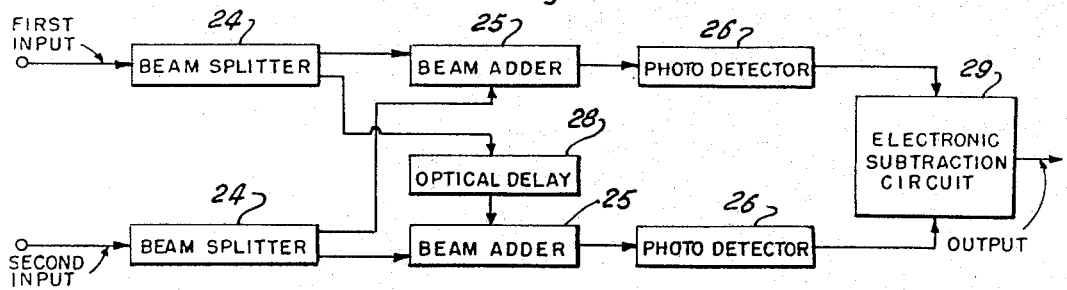

FIGURE 7 is a diagrammatic illustration of another form of a specific optical product detector.

Figure 8:
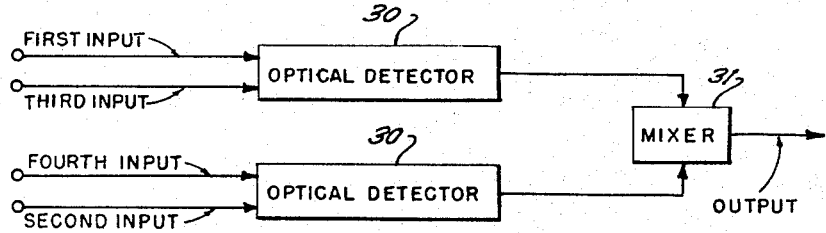

FIGURE 8 diagrammatically illustrates a four-channel optic-to-electric converter including optical detectors embodied in the circuits shown in FIGURES 6 and 7.

Figure 9:
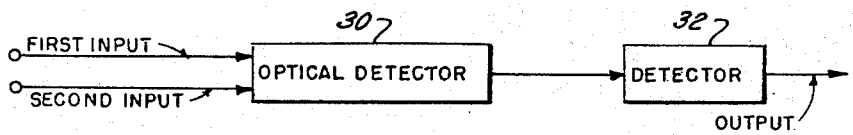

FIGURE 9 illustrates a two-channel optic-to-electric converter and is a modification of the form shown in FIGURE 8.

Figure 10:
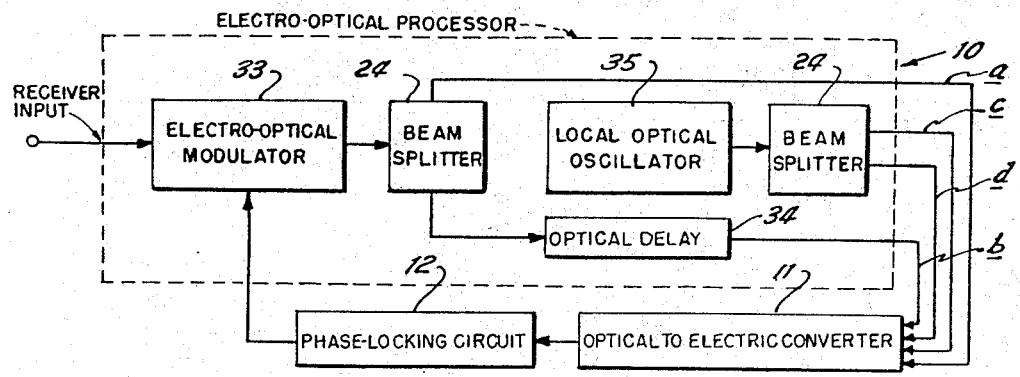

FIGURE 10 is a diagrammatic illustration of a phase-locking optical receiver, using a four-channel optical-to-electric converter, which is a specific realization of the general receiver shown in FIGURE 1.

Figure 11:
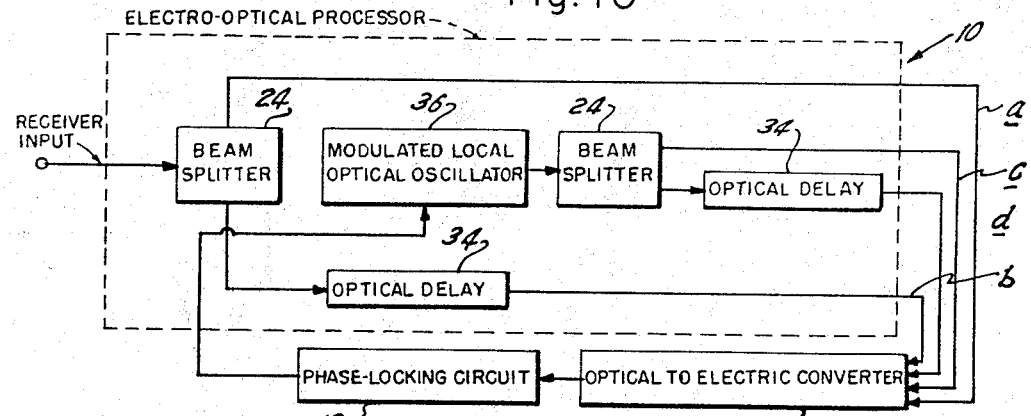

FIGURE 11 is a diagrammatic illustration of a second phase-locking optical receiver, using a four-channel optical-to-electric converter, which realizes the general receiver of FIGURE 1 and which permits the use of an internally modulated local optical oscillator.

Figure 12:
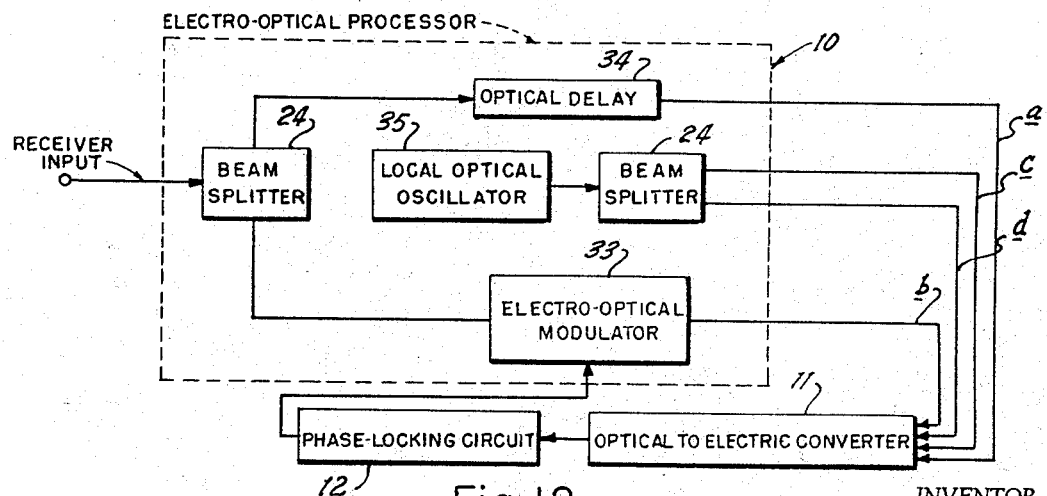

FIGURE 12 diagrammatically illustrates a third realization of the general phase-locking optical receiver of FIGURE 1, using a four-channel optical-to-electric converter, wherein the local microwave signal is asymmetrically placed on the receiver input.

Figure 13:
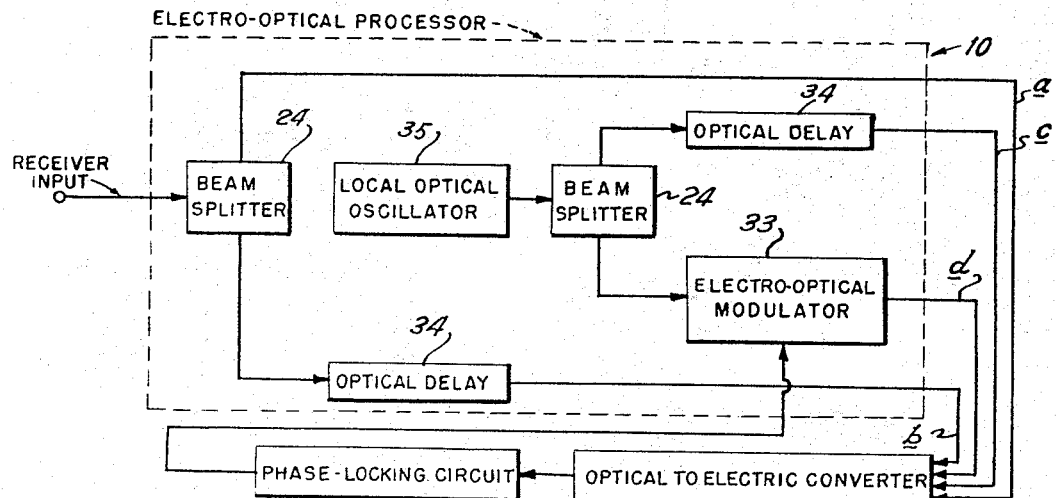

FIGURE 13 illustrates a fourth realization of the general receiver of FIGURE 1 and uses a four-channel optical-to-electric converter, wherein the local microwave signal is asymmetrically placed on the output of the local optical oscillator.

Figure 3:
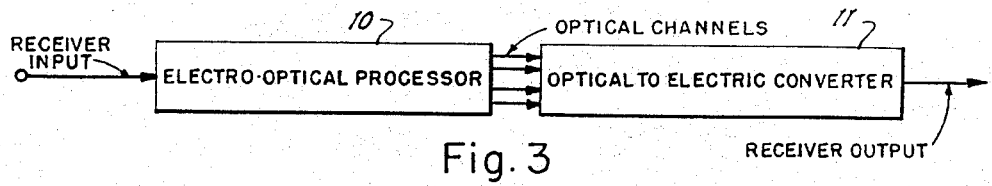
FIGURE 3 is a diagrammatic illustration of the general optical receiver for retrieving the microwave subcarrier as a spectrally discrete component at the subcarrier frequency.
Figure 14:
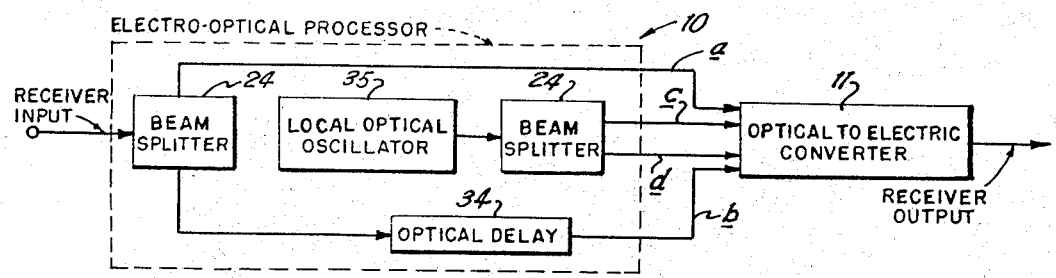

FIGURE 14 diagrammatically illustrates a realization of the general optical receiver of FIGURE 3, with a four-channel optical-to-electric converter.

Figure 15:
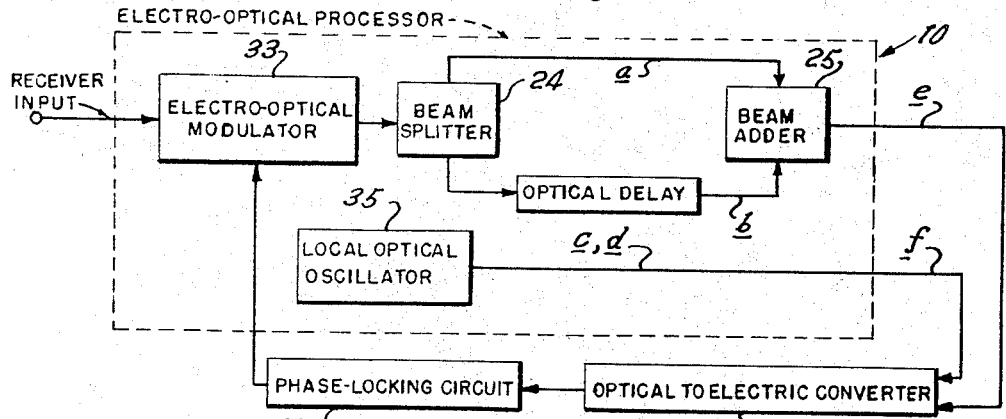

FIGURE 15 is a diagrammatic illustration of a phase-locking optical receiver having a two-channel optical-to-electric converter, herein being a simpler version of the receiver of FIGURE 10.

Figure 16:
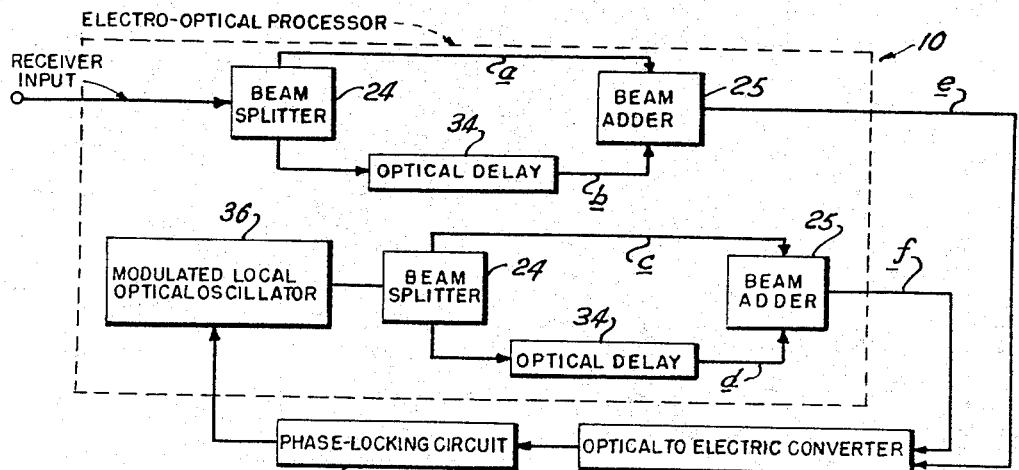

FIGURE 16 diagrammatically illustrates another form of a phase-locking optical receiver having a two-channel optical-to-electric converter, a simpler version of the receiver shown in FIGURE 11.

Figure 17:
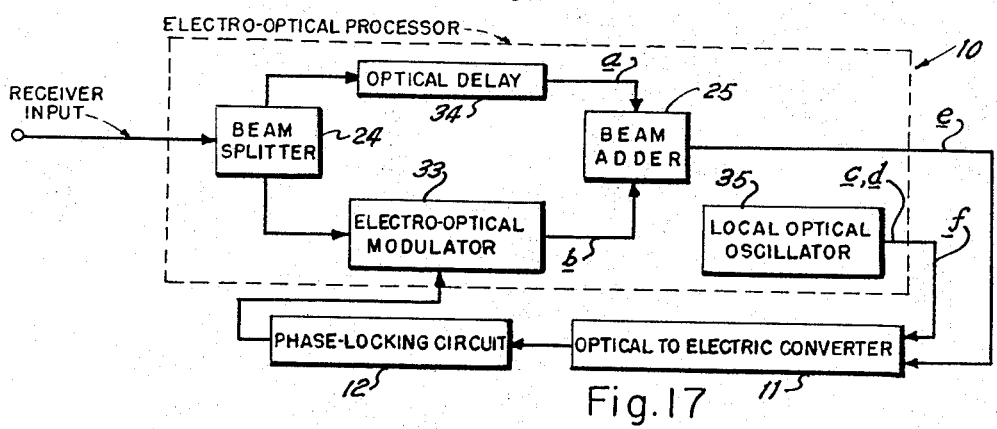

FIGURE 17 diagrammatically illustrates and optical receiver with a two-channel optical-to-electric converter, a simpler version of the receiver of FIGURE 12.

Figure 18:
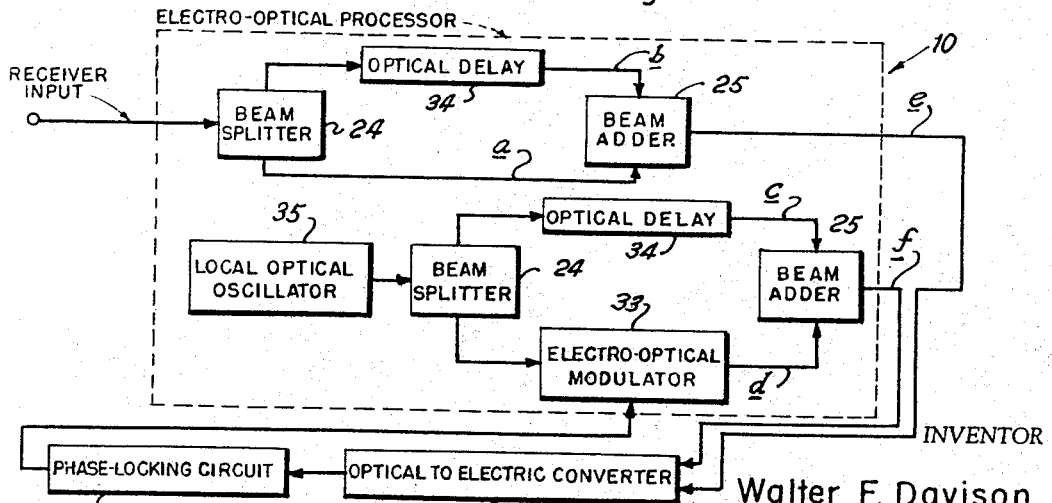

FIGURE 18 diagrammatically illustrates another form of two-channel phase-locking optical receiver, a simpler version of the receiver shown in FIGURE 13.

Figure 19:
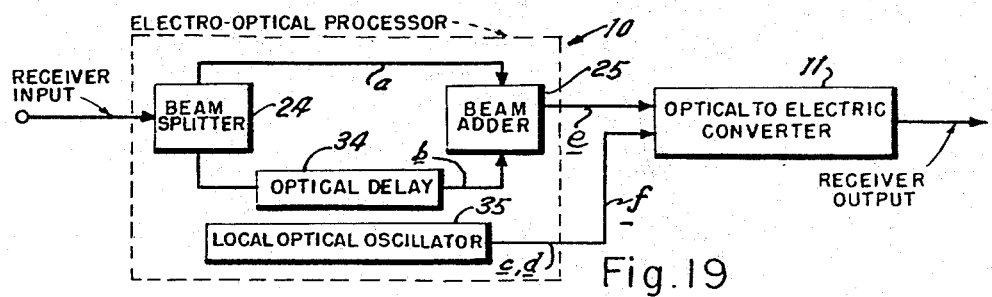

FIGURE 19 is a diagrammatic illustration of a two-channel optical receiver, a simplification of the receiver of FIGURE 14.

Figure 20:
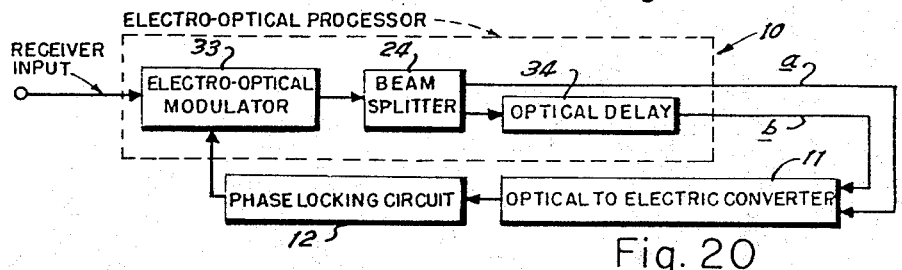

FIGURE 20 diagrammatically illustrates a phase-locking optical receiver from which the local optical oscillator is omitted.

Figure 21:
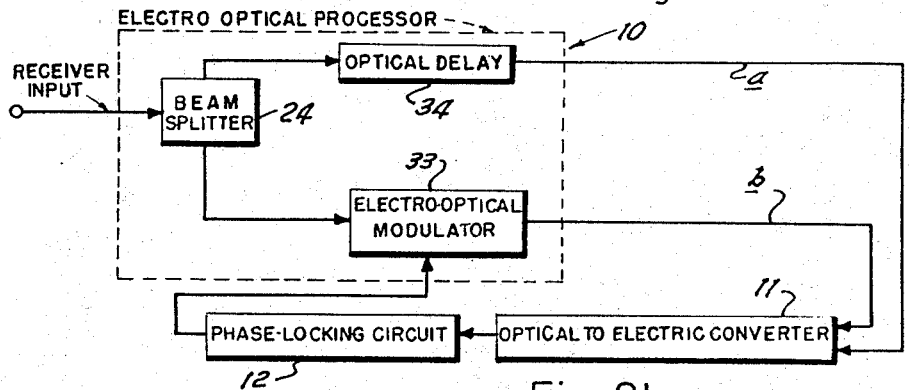

FIGURE 21 is a diagrammatically illustrated phase-locking optical receiver similar to that shown in FIGURE 20.

Figure 22:
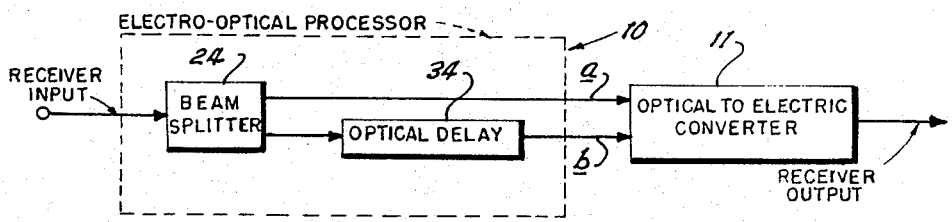

FIGURE 22 illustrates a receiver such as shown in FIGURES 20 and 21 from which the phase-locking circuit and the electro-optical modulator are omitted, providing a receiver having the general character of that shown in FIGURE 3.

Figure 23:
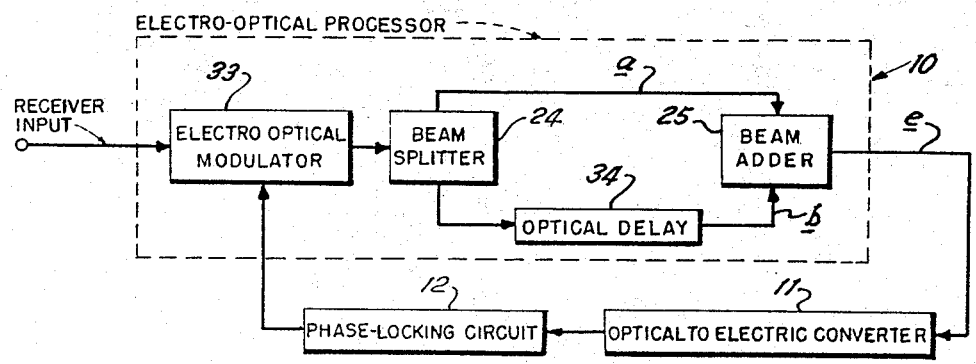
Figure 24:
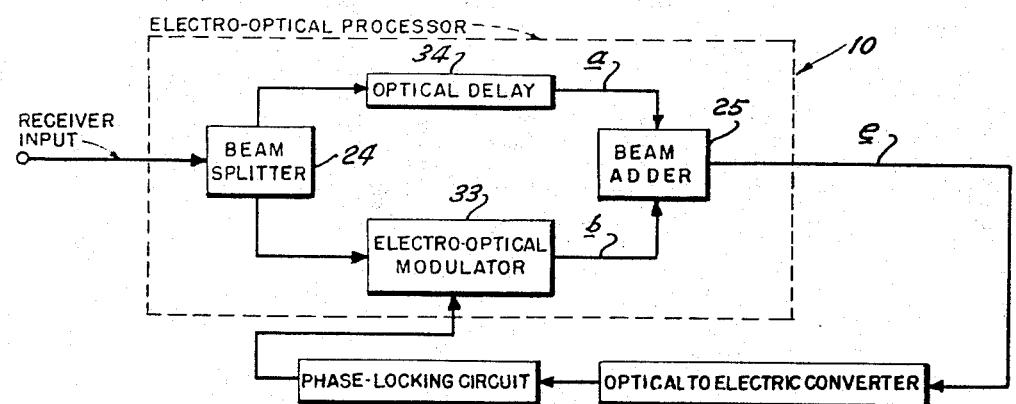
Figure 25:
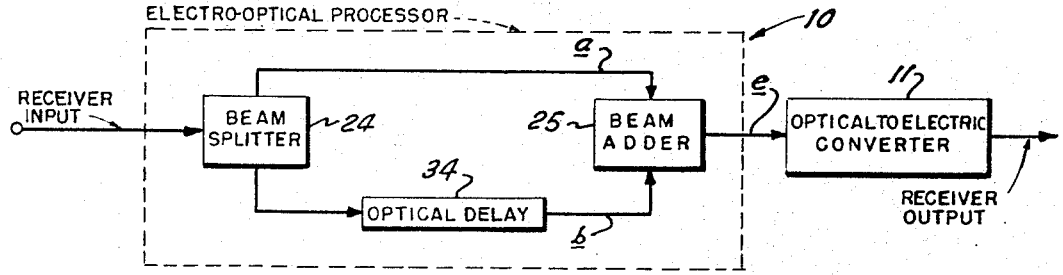

FIGURES 23, 24, and 25 illustrate, respectively, simplified versions of the receivers of FIGURES 20, 21, and 22, wherein the optical-to-electric converter is a photodetector.

The invention, therefore, has for its principal object the provision of means by which the performance of so-called optical receivers can be materially improved, and while several variations of my concept are presented herein, it will become apparent that the basic elements can be realized within the current state of the electro-optical art and vary only in their association.

In FIGURE 1 is illustrated an arrangement in which an input consisting of an optical carrier modulated with a microwave subcarrier is subjected to optical processing in an electro-optical processor 10 which is depicted diagrammatically in greater detail and in several versions in other illustrations. The second input to the electro-optical processor 10 is a microwave signal originating in the phase-locking circuit 12. The output of the electro-optical processor 10 is comprised of one, two, or four optical beams which are the inputs to the optical-to-electric converter 11, the output of which is an electrical signal having a spectrally discrete component at a frequency which is a difference frequency obtained from mixing the microwave subcarrier and the output of the phase-locking circuit 12. This difference signal is the input to the phase-locking circuit 12, completing the principal loop of the optical receiver. In operation the microwave subcarrier is phase-locked to a local oscillator in the phase-locking circuit 12.

Figure 2:
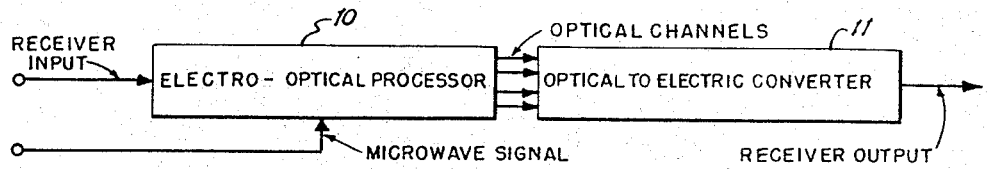

By omitting the phase-locking circuit 12, replacing the output of the circuit 12 with a microwave signal from an independent source, and taking the difference signal from the optical-to-electric converter 11 as the output of the receiver, there is realized a general optical receiver for detecting the microwave subcarrier as a spectrally discrete component at a frequency which is the difference of the microwave subcarrier frequency and the microwave signal frequency, as illustrated in FIGURE 2.

In the direction of an even more elementary class of optical receivers, means of modulating an optical beam may be omitted from the electro-optical processor 10, as shown in FIGURE 3, wherein the output of this general receiver contains a spectrally discrete component at the microwave subcarrier frequency, provided the photodetectors in this receiver pass this frequency.

The first major subcircuit of the phase-locking receivers of this invention is the phase-locking circuit 12. This circuit may take a number of forms according to the state of the art of phase-locking radio receivers. For the purposes of the optical receivers of this invention the circuit 12 may take two basic forms, i.e., one of which employs a low frequency voltage-controlled oscillator, which phase-locks at a difference frequency, and a frequency multiplier, and the other employs a voltage-controlled oscillator, which phase-locks at the microwave subcarrier frequency, and a free-running low frequency oscillator to provide a difference frequency.

Figure 4:
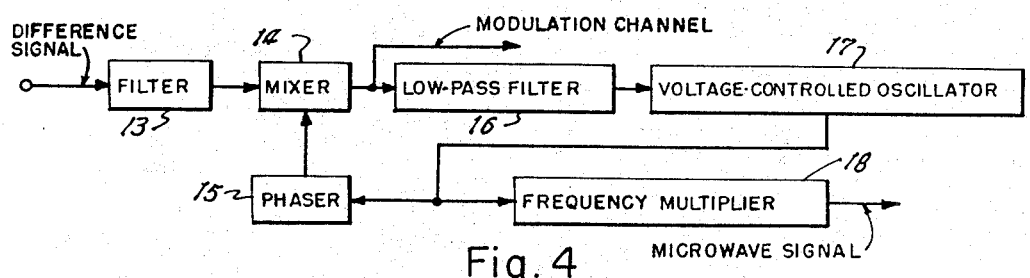
FIGURE 4 is a diagrammatic illustration of a specific realization of the phase-locking circuit shown in FIGURE 1.

The input to the phase-locking circuit 12 shown in FIGURE 4 is the difference signal. This signal originates in the converter 11, and has a spectrally discrete component at a frequency which is a difference frequency obtained from the mixing of the microwave subcarrier and the microwave signal from a frequency multiplier 18. The difference signal is directly connected to a filter 13, which is designed to pass the desired spectrally discrete component and any modulation on this discrete component that originates as modulation on the microwave subcarrier. The output of the filter 13 is directly connected to a mixer 14.

The output of a phaser 15, which is at the frequency of a voltage-controlled oscillator 17, is directly connected to the mixer 14 and in the proper phase relation to the difference signal to produce an error signal at the output of the mixer 14. The output of the mixer 14 is directly connected to a modulation channel, for further processing external to the optical receiver of any modulation originally on the microwave subcarrier, and directly connected to a low-pass filter 16. The output of the low-pass filter 16 is an error voltage near D.C. which is directly connected to the oscillator 17 to provide control of the oscillator 17, the output of the oscillator 17 being directly connected to the phaser 15, completing the internal loop of this phase-locking circuit.

The output of the oscillator 17 is also directly connected to the frequency multiplier 18 while the output of the latter, at a frequency which is a multiple of the frequency of the output of the oscillator 17, is the microwave signal output of the phase-locking circuit. The principal loop of the general phase-locking optical receiver of FIGURE 1 is completed by directly connecting the microwave signal output to the processor 10. In operation the voltage-controlled oscillator phase-locks at the difference frequency.

FIGURE 5 illustrates the second basic version of the phase-locking circuit 12. Elements 13, 14, 16, and the modulation channel are connected and perform as in the circuit of FIGURE 4. The error voltage from element 16 controls the voltage-controlled oscillator 19, which now locks at the microwave subcarrier frequency. The output of the oscilaltor 19 is led through the phaser 20 to the mixer 21. The free-running oscillator 22, which is at the desired difference frequency and which does not lock, is directly connected to the mixer 14 and connected through the phaser 23 to the mixer 21, the output of which, at either the sum or difference of the frequencies of oscillators 19 and 22 provides the microwave signal to complete the locking loop of the receiver through the processor 10 and converter 11. The phasers 20 and 23 are adjusted to provide the proper sense to the error voltage controlling the oscillator 19. The important spectral component in the difference signal from the converter 11 is now at the frequency of oscillator 22.

These phase-locking circuits of FIGURES 4 and 5 may be modified in ways obvious to those skilled in the art without departing from the spirit and scope of the appended claims. In particular, intermediate frequency channels may be incorporated in the phase-locking circuits in a manner analogous to their use in microwave phase-locking receivers, and discriminator circuits may be employed which yield an error signal for the voltage-controlled oscillator which is independent of modulation originally on the microwave subcarrier. Furthermore, it is possible directly to modify conventional phase-locking receivers designed for the radio region so as to serve as phase-locking circuits for optical receivers.

FIGURE 4A illustrates a phase-locking circuit obtained by modifying a phase-locking receiver. The input to this phase-locking circuit is the difference signal which originates in the optical-to-electric converter 11 and which has a descrete spectral component at a frequency which is the difference of the frequency of the microwave subcarrier and the frequency of the microwave signal. This input is directly connected to the phase-locking receiver 12A which contains a voltage-controlled oscillator 17 which is frequency-controlled by an error voltage and which is capable of being phase-locked to an input to the phase-locking receiver 12A at the frequency of the discrete spectral component. The output of the voltage-controlled oscillator 17 is directly connected to a frequency multiplier 18 to produce an electrical signal whose frequency is a multiple of the frequency of the output of the voltage-controlled oscillator and for which the difference of the frequency of the output of the frequency multiplier 18 and the frequency of the microwave subcarrier is the frequency of the discrete spectral component. The output of the frequency multiplier 18 is directly connected to the phaser 20 to produce a phase-shifted signal which is the microwave signal, the latter being the output of this phase-locking circuit. The principal loop of the general phase-locking optical receiver of FIGURE 1 is completed by directly connecting the microwave signal to the electro-optical processor 10. In operation the voltage-controlled oscillator 17 phase-locks to the microwave subcarrier at a subharmonic frequency, the frequency of the discrete spectral component.

Alternatively, for a phase-locking receiver 12A capable of receiving a radio frequency signal at the frequency of the microwave subcarrier and containing a mixer 14 which accepts the radio frequency signal, after possible amplification, and which also accepts a microwave signal generated in the phase-locking receiver 12A to produce a difference signal at a low frequency ultimately to achieve phase-locking of the radio frequency signal to an oscillator contained within the phase-locking receiver 12A, it is possible directly to modify the phase-locking receiver 12A so as to have a phase-locking circuit 12 for optical receivers. To achieve this the elements of the input channel of the phase-locking receiver 12A up to and including the mixer 14 are removed, the remaining elements in original combination becoming the phase-locking circuit 12. To obtain a phase-locking optical receiver of FIGURE 1 an electro-optical processor 10 and an optical-to-electric converter 11 are used in conjunction with the phase-locking circuit 12, the loop being completed in the usual manner. FIGURE 5a diagrammatically gives a comparison of the original phase-locking receiver 12A and the resulting phase-locking circuit 12.

FIGURE 5B illustrates phase-locking circuit obtained by direct modification of a phase-locking receiver 12A. The input to this phase-locking circuit is the difference signal from the optical-to-electric converter 11 and contains a discrete spectral component at a frequency which is the difference of the frequency of the microwave subcarrier and the frequency of the microwave signal. This input is directly connected to a mixer 21 which also accepts the output of the free-running oscillator 22, which is at the frequency of the microwave signal, to produce an output from the mixer 21 which has a discrete spectral component at the frequency of the microwave subcarrier. The output of the mixer 21 is led directly to a phase-locking receiver 12A which is capable of phase-locking to an input at the microwave subcarrier frequency. The free-running oscillator 22 also provides the microwave signal to the electro-optical processor 11.

The second major subcircuit of the invention is the optical-to-electric converter 11, the purpose of which is to convert into an electrical signal one or more optical beams. Embodied in each of the structures shown for the optical-to-electric converter 11 are either one or more optical product detectors next to be described, or one or more photodetectors.

FIGURE 6 diagrammatically illustrates an optical product detector. The first input, which is an optical beam, is led directly into a first beam splitter 24 which may be any means for splitting a beam of light, such as a half-silvered mirror. One half of the output of the first beam splitter 24 is led directly to a beam adder 25, and the remaining half is directly impinged on a first photodetector 26. The second input, which is an optical beam, is led directly into a second beam splitter 24, one half of the output of which is led directly into the beam adder 25 and the remaining half is directly impinged on a second photodetector 26. The beam adder 25 may be any means for additively combining two beams of light, such as a half-silvered mirror, and its output is directly impinged on a third photodetector 26.

The electrical signals which are the respective outputs of the photodetectors 26 are directly connected to an electronic addition-subtraction circuit 27, the purpose of which is to provide an output consisting of the signal from the third photodetector 26 from which have been subtracted the signals from the first and second photodetectors 26. The output of the element 27 is the output of the optical product detector and contains the low frequency components, as determined by the frequency response of the photodetectors 26, of the product of the first and second inputs to the optical product detector.

In FIGURE 7, which is the block diagram of a second specific optical product detector, the first input is led directly into a first beam splitter 24, one half of the output of which is led directly to a first beam adder 25. The remaining half of the output of the first beam splitter 24 is led through an optical delay 28 to a second beam adder 25. The optical delay 28 may be any conventional means for making the optical path length from the first beam splitter 24 to the second beam adder 25 one-half wave length longer than the optical path length from the first beam splitter 24 to the first beam adder 25, wherein this one-half wavelength corresponds to the center frequency of the first input.

The second input is led directly to a second beam splitter 24, one-half of the output being led directly to the first beam adder 25 while the remaining half is led directly to the second beam adder 25. The output of the first beam adder 25 is led directly to a first photodetector 26. The output of the second beam adder 25 is led directly to a second photodetector 26. The outputs of the first and second photodetectors 26 are directly connected to an electronic subtraction circuit 29, the output of the latter being the output of the opical product detector, and being an elecrical signal which is the difference between the output of the first photodetector 26 and the output of the second photodetector 26. The output of the optical product detector consists approximately of the low-frequency components of the product of the first and second inputs to the optical product detector. The longer the coherency-length (equivalently, the narrower the spectral width) of the first optical input relative to the wavelength at the central frequency of this input the better is the performance of this optical product detector.

In FIGURE 8 is diagrammatically shown a four-channel optical-to-electric converter whose first and third inputs, which are optical beams, are led directly into a first optical detector 30. The optical detector 30 is specifically, in order of preference, the optical product detector of the circuits shown in FIGURE 6, or the optical product detector of the structure shown in FIGURE 7, or comprises a photodetector upon which the beams are simultaneously impinged. The second and fourth inputs, which are optical beams, are led directly into a second optical detector 30. The outputs of the first and second optical detectors 30, which are electrical signals, are directly connected to a mixer 31 of conventional electronic design. The output of the mixer 31 is the output of the four-channel optical-to-electric converter.

The four-channel optical-to-electric converter may be used to obtain a difference signal with the desired spectrally discrete component as the input to the phase-locking circuit 12, while having a sufficiently strong signal to ameliorate electronic and photodetector noise. For the first and second inputs, having originated in an optical source or sources statistically uncorrelated with the original source or sources of the third and fourth inputs, the output of the converter will have low frequency discrete spectral components, the frequencies of which are determined by the convolution of the low frequency discrete spectral components of the product of the first and second inputs with the low frequency discrete spectral components of the product of the third and fourth inputs.

The magnitudes of these discrete spectral components in the output are essentially determined by the magnitudes of the discrete spectral components of the first-second product, by the magnitudes of the discrete spectral components of the third-fourth product, and by the frequency response of the photodetectors in the converter. In particular, for the first and second optical inputs having been obtained by processing the input to the optical receiver in the electro-optical processor 10, and the third and fourth optical inputs having been obtained by beam-splitting the output of a strong local optical oscillator located in the processor 10, the output of the converter will have low frequency discrete spectral components corresponding to the low frequency discrete spectral components of the product of the first and second optical inputs, by virtue of convolution with the discrete D.C. component of the product of the third and fourth optical inputs. Furthermore, for the third and fourth optical inputs originating in a strong local optical oscillator, and subsequently having been modulated in the processor 10 by the microwave signal, the output of the converter will contain discrete spectral components at frequencies corresponding to differences of the frequencies of the discrete spectral components of the first-second product with the frequencies of the discrete spectral components of the third-fourth product.

FIGURE 9 shows the arrangement of a two-channel optical-to-electric converter. The first and second inputs, which are optical beams, are led directly to an optical detector 30 which is similar to the optical detectors employed in the circuit of FIGURE 8. The output of the detector 30, which is an electrical signal, is directly connected to a detector 32 which is of conventional electronic design, and specifically may be a square-law device. The output of the detector 32 is the output of the two-channel optical-to-electric converter.

The converter of FIGURE 9 may be used in a manner analogous to the converter illustrated in FIGURE 8. In particular, the description of the performance of the four-channel converter of FIGURE 8 applies to the performance of the two-channel converter of FIGURE 9, upon replacing references to the product of the first and second inputs with the product of the first input with itself and replacing references to the product of third and fourth inputs with the product of the second input with itself, as previously described.

The third major subcircuit of the invention is the electro-optical processor 10. The inputs to this element are the receiver input, which is the optical carrier with microwave subcarrier, and the microwave signal, which is the output of the phase-locking circuit 12. The output of the processor 10 is one, two, or four optical beams, obtained by processing the inputs and serving as inputs to the optical-to-electric converter 11. The means of processing entail electro-optical modulation of an optical beam, interferometric filtering of optical beams, and in some cases, the use of a local optical oscillator as a source of a strong optical beam. Interferometric filtering is of particular importance for it serves as a means of demodulating phase modulation on an optical beam without resorting to a conventional phase-to-amplitude converter. In addition, the great coherency-length of optical beams generated by lasers permits interferometric arrangements that are not practical with conventional optical beams.

Each specific design for the electro-optical processor 10 is determined in part by the specific design of the optical-to-electric converter 11 with which it is synthesized. The resulting specific optical receivers may be classified as follows: (1) An electro-optical processor with local optical oscillator, and four-channel optical-to-electric converter; (2) an electro-optical processor with local optical oscillator, and two-channel optical-to-electric converter; (3) an electro-optical processor without local optical oscillator, and optical product detector, and (4) an electro-optical processor without local optical oscillator, and photodetector. Each of these specific receivers will now be described in connection with diagrams herein whereby the products illustrated in FIGURES 1, 2, and 3 can be accomplished.

In FIGURE 10 is specifically illustrated a phase-locking optical receiver in which the input, which is an optical carrier with microwave subcarrier, is led directly into an electro-optical modulator 33. The microwave signal, which is the output of the phase-locking circuit 12, is directly connected thereto. The output of the modulator 33 is an optical beam which has impressed upon it, as modulation, both the microwave subcarrier and the microwave signal which is the output of the circuit 12. This achieves preliminary mixing of the microwave subcarrier with the microwave signal directly on the optical beam. The output of the modulator 33 is led directly to a first beam splitter 24, one-half of whose output is led directly to the output channel $a$ of the electro-optical processor 10 while the remaining half thereof is led through an optical delay 34 to the output channel $b$ of the processor 10.

The output of a local optical oscillator 35, which provides a strong optical beam at the receiver, is led directly to a second beam splitter 24, one-half of its output being led directly to the output channel $c$ of the processor 10 while its remaining half is led directly to the output channel $d$ of the processor 10. The outputs of the channels $a$, $b$, $c$ and $d$, which are potical beams, are led directly and respectively to the first, second, third, and fourth input channels of the optical-to-electric converter 11.

In the optical receiver illustrated in FIGURE 10 the converter 11 is specifically the four-channel optical-to-electric converter shown in FIGURE 8. The output of the converter 11 is directly connected to the circuit 12, completing the principal loop of the optical receiver. The circuit 12 is specifically the phase-locking circuit of FIGURE 4, or the phase-locking circuit of FIGURE 5, or any circuit within the state of the phase-locking art performing the requisite function.

The purpose of the modulator 33 is to modulate the incoming receiver input with the output of the circuit 12. This may be accomplished in a number of ways, depending on the state of the electro-optical modulator art. For example, use may be made of a transparent crystal, such as potassium dihydrogen phosphate, whose index of refraction varies with the magnitude of an electric field imposed on the crystal. Employing the output of the circuit 12 to drive such a field, the receiver input is phase modulated upon passage through such a crystal. Various modifications may also be used for example a Fabry-Perot structure around the crystal to enhance the modulation effect, a Pockels cell arrangement to achieve a form of amplitude modulation, or a phase modulator such as described above in one arm of a split-beam interferometer to achieve a modified form of phase modulation. For the purpose of explicating the design of FIGURE 10, and each subsequent receiver design, the phrases "electro-optical modulator 33" and "modulator 33" specifically denote an electro-optical modulator, current state of the art examples of which are discussed above, the specific form of the modulator 33 being determined by the communication problem at hand.

The purpose of the optical delay 34, which follows the first beam splitter 24, is to modify the magnitudes of the spectral modulation zones of the output of the modulator 33. The manner in which the optical beam from the modulator 33 is split, led out of the processor 10 via channels a and b, and ultimately recombined by photodetector mixing in the converter 11, yields an effect analogous to that achieved by a split-beam interferometer. Since an interferometer is a realization in the optical region of a passive, linear filter, spectral modification of the output of the modulator 33 is achieved. The optical delay 34 is adjusted to optimize the magnitude of the desired spectrally discrete component of the difference signal which is the output of the converter 11. Whenever either the microwave subcarrier or the microwave signal from circuit 12 is placed on the optical carrier in the form of phase modulation the optical delay 34 is essential.

The interferometric filtering afforded by the use of the optical delay 34, in conjunction with the first beam splitter 24 may be accomplished in other ways well known in the interferometric art, without departing from the spirit and scope of the invention. In particular, one or more Fabry-Perot interferometers may be placed between the modulator 33 and the first beam splitter 24, between the first beam splitter 24 and the output channel a, or between the first beam splitter 24 and the output channel b, and such devices may be employed in providing interferometric filtering means in the construction of each of the optical circuits described herein in which is embodied the arrangement of a beam splitter and an optical delay.

The purpose of the local optical oscillator 35, shown in FIGURE 10, is to provide at the receiver a strong optical beam for the channels c and d to the converter 11. Whenever the optical carrier is the output of a laser, which is desirable, the oscillator 35 should also be a laser with output of like central frequency in order to obtain a strong difference signal upon mixing the outputs of channels a and b with the outputs of channels c and d in the converter 11. Nevertheless, an oscillator 35 with an output of greater spectral width than the spectral width of the optical carrier may be employed to ameliorate the necessity for the oscillator 35 Doppler-tracking the source of the optical carrier, for circumstances in which this source is moving relative to the oscillator 35. Since in this particular design no modulation is placed on the output of the oscillator 35 it is not necessary to provide means for interferometric filtering in the optical circuit between the oscillator 35 and the channels c and d.

In the circuit shown in FIGURE 11, the receiver input is led directly to a first beam splitter 24, one-half of the output thereof being led directly to the output channel a of the electro-optical processor 10 while the remaining half is led through a first optical delay 34 to the output channel b of the processor 10. The microwave signal from the phase-locking circuit 12 is led directly to a modulated local optical oscillator 36, the output of which is led directly into a second beam splitter 24. One-half of the output of the second beam splitter 24 is led directly to the output channel c of the processor 10, and the remaining half is led through a second optical delay 34 to the output channel d of the processor 10. The remaining elements of the receiver of FIGURE 11 are identical to and connected in the same manner as the corresponding elements of the receiver of FIGURE 10.

The modulated local optical oscillator 36 in FIGURE 11 may be a local optical oscillator 35 followed by an electro-optical modulator 33, or it may be a source of optical radiation which is modulated internally. Examples of the latter are a gallium arsenide laser whose pumping current is modulated, or an optically pumped laser whose associated Fabry-Perot structure is made to vary in optical path length by electro-optical means.

A third arrangement for a phase-locking optical receiver employing a four-channel optical-to-electric converter is illustrated in FIGURE 12. The receiver input is led directly into a first beam splitter 24, and one-half of its output is led through an optical delay 34 to the output channel a of the electro-optical processor 10, the remaining half of the output of the first beam splitter 24 being led directly to an electro-optical modulator 33. The microwave signal, which is the output of the phase-locking circuit 12, is directly connected to the modulator 33 whose output is led directly to the output channel b of the processor 10. The output of a local optical oscillator 35 is led directly to a second beam splitter 24, one-half of whose output is led directly to the output channel c of the processor 10, the remaining half of which is led directly to the output channel d of the processor 10. The remaining elements of the receiver of FIGURE 12 are identical to and connected in the same manner as the corresponding elements of the receiver of FIGURE 10.

FIGURE 13 illustrates a fourth optical receiver circuit, in which the receiver input is led directly into a first beam splitter 24, and one-half of the output of the latter is led directly to the the output channel a of the electro-optical processor 10, while the remaining half is led through a first optical delay 34 to the output channel b of the processor 10. The output of a local optical oscillator 35 is led directly to a second beam splitter 24, one-half of the output thereof being led through a second optical delay 34 to the output channel c of the processor 10 and the remaining half being led directly to an electro-optical modulator 33. The microwave signal from the phase-locking circuit 12 is directly connected to the modulator 33 whose output is led directly to the output channel d of the processor 10. The remaining elements of the receiver of FIGURE 13 are identical to and connected in the same manner as the corresponding elements of the receiver of FIGURE 10.

The optical receivers of FIGURES 10, 11, 12 and 13 differ only in the structure of their respective processors 10, and the choice of one design over the others is dependent on the communication problem at hand. This choice is influenced strongly by the respective forms of modulation used to place the microwave subcarrier on the optical carrier and to place the microwave signal on either the receiver input or the local optical oscillator.

The receiver of FIGURE 10 achieves the mixing of the microwave subcarrier and the microwave signal in two steps, a preliminary mixing on the optical carrier followed by a mixing in the photo-detectors of the converter 11. The adjustment of the optical delay 34 for best performance depends on the coherency-length of the optical carrier (for an effect analogous to interferometric "fringe darkening" may arise as a problem) on the type, frequency, and index of modulation of the microwave subcarrier, and on the type, frequency, and index of modulation of the microwave signal. Ordinarily best performance is a compromise between best enhancement of the microwave subcarrier and best enhancement of the microwave signal. For both the microwave subcarrier and the microwave signal being placed on the optical carrier as amplitude modulation the optical delay 34 is not absolutely necessary, leading to the advantage of simplest receiver design. Another advantage inherent in the receiver of FIGURE 10 is freedom to use an oscillator 35 of relative broad spectral width, as permitted by there being no interferometric filtering in channels c and d of the processor 10.

In the receiver of FIGURE 11 the mixing of the microwave subcarrier and the microwave signal occurs first at the point of photodetection in the converter 11. The advantages of this receiver are two-fold: internally modulated local optical oscillators may be used, and the two optical delays 34 may be adjusted independently and respectively for the receiver input and for the output of the modulated oscillator.

The receiver of FIGURE 12 is similar to the receiver of FIGURE 10 with the following exception: the asymmethric positioning of the modulator 33 permits the microwave signal to be placed on the optical carrier as a modified form of phase modulation, provided the modulator 33 is a phase modulator. This is analogous to using a phase modulator in one arm of a split beam interferometer.

In the receiver of FIGURE 13 mixing of the microwave subcarrier and microwave signal again first occurs at the photodetectors. The optical delays 34 are independently adjustable as in the receiver of FIGURE 11, and the advantage of modified phase modulation found in the receiver of FIGURE 12 is herein embodied.

By omitting the phase-locking circuit 12, but still providing a local microwave signal to drive the electro-optical modulator 33 or the modulated local optical oscillator 36, each of the receivers illustrated in FIGURES 10, 11, 12 and 13 becomes a receiver for detecting the microwave subcarrier as a discrete spectral component at a difference frequency in the output of the optical-to-electric converter 11. These modified receivers, which are counterparts to the receivers shown in FIGURES 10, 11, 12 and 13, are specific realizations of the general optical receivers of the structure shown in FIGURE 2.

By omitting both the phase-locking circuit 12 and means for electro-optical modulation of light from the four phase-locking optical receivers illustrated diagrammatically in FIGURES 10, 11, 12 and 13, these structures are reduced to a specific optical receiver which is a realization of the general optical receiver shown in FIGURE 3, and which permits the detection of the microwave subcarrier as a discrete spectral component at the microwave subcarrier frequency in the output of the optical-to-electric converter 11.

FIGURE 14 is a diagram of this receiver, and its input is led directly to a first beam splitter 24, one-half of its output being led directly to the output channel $a$ of the electro-optical processor 10 while its remaining half is led through an optical delay 34 to the output channel $b$ of the processor 10. The output of a local optical oscillator 35 is led directly to a second beam splitter 24, one-half of whose output is led directly to the output channel $c$ of the processor 10 while its remaining half is lead directly to the output channel $d$ of the processor 10. The processor 10 is connected to the optical-to-electric converted 11 in a manner identical to the corresponding connection of previous receivers, wherein the converter 11 is the four-channel optical-to-electric converter of FIGURE 8, its output being the output of this receiver.

Each of the five specific optical receiver designs illustrated in FIGURES 10, 11, 12 13 and 14 have embodied therein the four-channel optical-to-electric converter of the structure of FIGURE 8. Somewhat less flexible specific optical receivers are possible with the use of the two-channel optical-to-electric converter of the circuit shown in FIGURE 9. There are five such receivers, corresponding to two-channel versions of the above five receivers.

To achieve these two-channel receivers the optical beams of the output channel $a$ and $b$ of the processor 10 are combined in a first beam adder 25 to obtain a first beam which is led directly to an output channel $e$. Similarly, the optical beams of the output channels $c$ and $d$ of the processor 10 are combined in a second beam added 25 to obtain a second beam which is lead directly to an output channel $f$. In the receivers of FIGURES 10, 12 and 14 this latter modification leads to a structure consisting of a second beam splitter 24 follower by a second beam adder 25. This is an unnecessary structure, and so the channels $c$, $d$ and $f$ are merely identified in these cases. The outputs of the new channels $e$ and $f$ of the processor 10 are lead directly and respectively to the first and second input channels of the converter 11, which is specifically the two-channel optical-to-electric converter illustrated in FIGURE 9. The remaining elements of these new receivers are identical to and connected in the same manner as the corresponding elements of the receivers of FIGURES 10, 11, 12, 13 and 14. These resulting five new receivers are diagrammatically illustrated in FIGURES 15, 16, 17, 18 and 19, respectively. The receivers of FIGURES 15, 16 17 and 18 are specific realizations of the general phase-locking receiver of FIGURE 1, and the receiver of FIGURE 19 realizes the general receiver of FIGURE 3.

By omitting the phase-locking circuit 12, but still providing a local microwave signal to drive the electro-optical modulator, each of the receivers illustrated in FIGURES 15, 16, 17 and 18 becomes a receiver for detecting the microwave subcarrier as a discrete spectral component at a difference frequency in the output of the optical-to-electric converter 11. These modified receivers, which are counterparts to the receivers of FIGURES 15, 16, 17 and 18, are specific realizations of the general optical receiver shown in FIGURE 2, with a two-channel optical-to-electric converter.

Each of the optical receivers illustrated diagrammatically in FIGURES 10 through 19 uses a local optical oscillator for the purpose of ameliorating photodetector and electronic noise. If the receiver input is sufficiently strong, so that the problem of receiver noise is not serious, analogous but simpler receiver designs which do not require a local optical oscillator are practical. Such receivers without a local optical oscillator use either an optical product detector or a photodetector as the required optical-to-electric converter.

In FIGURE 20 is illustrated a phase-locking optical receiver which does not employ a local optical oscillator. The receiver input is led directly into an electro-optical modulator 33. The microwave signal which is the output of the phase-locking circuit 12 is directly connected to the modulator 33, and the output of the latter is led directly into the beam splitter 24, one-half of the output thereof being led directly to the output channel $a$ of the electro-optical processor 10, and the remaining half is led through an optical delay 34 to the output channel $b$ of the processor 10. The outputs of the channels $a$ and $b$ are led directly and respectively to the first and second input channels of the optical-to-electric converter 11.

In the receiver just described the converter 11 is identical to the optical product detector of the structure shown in FIGURE 6, or the optical product detector of the device shown in FIGURE 7. The output of the converter 11 is directly connected to the phase-locking circuit 12, completing the principal loop of the optical receiver. The circuit 12 is specifically the phase-locking circuit of FIGURE 4, or the phase-locking circuit of FIGURE 5, or any circuit within the state of the phase-locking art performing the requisite function.

Whenever the optical delay 34, or any other form of interferometric filtering, is omitted between the modulator 33, and the output channels $a$ and $b$, the outputs of channels $a$ and $b$ are identical. In this case the optical product detector serving as the converter 11 may be replaced by a photodetector, upon which the output of the modulator 33 is directly impinged.

In FIGURE 21 is diagrammatically shown a second phase-locking optical receiver which does not use a local optical oscillator. The receiver input is led directly into a beam splitter 24, one-half of the output thereof being led through an optical delay 34 to the output channel $a$ of the electrooptical processor 10, the remaining half of the output of the beam splitter 24 being led directly into an electro-optical modulator 33. The microwave signal, which is the output of the phase-locking circuit 12, is directly connected to the modulator 33, the output of which is led directly to the output channel *b* of the processor 10. The remaining elements are identical to and connected in the same manner as the corresponding elements in the receiver of FIGURE 20.

By omitting the phase-locking circuit 13, but still providing a local microwave signal to drive the electro-optical modulator, each of the receivers shown in FIGURES 20 and 21 becomes a receiver for detecting the microwave subcarrier as a discrete spectral component at a difference frequency in the output of the optical-to-electric converter 11. These modified receivers, which are counterparts to the receivers diagrammatically depicted in FIGURES 20 and 21, are specific realizations of the general optical receiver shown in FIGURE 2.

By omitting both the phase-locking circuit 12, and the electro-optical modulator 33, the two phase-locking optical receivers illustrated in FIGURES 20 and 21 reduce to a specific optical receiver which is a realization of the general optical receiver shown in FIGURE 3, and which permits the detection of the microwave subcarrier as a discrete spectral component at the microwave subcarrier frequency in the output of the optical-to-electric converter 11. FIGURE 22 is a diagrammatic illustration of the receiver described above.

The input of the receiver shown in FIGURE 22 is led directly into a beam splitter 24, one-half of the output of which is led directly to the output channel *a* of the electro-optical processor 10, the remaining half being led through an optical delay 34 to the output channel *b* of the processor 10. The outputs of channels *a* and *b* are led directly and respectively to the first and second input channels of the optical-to-electric converter 11. In this receiver the converter 11 is specifically the optical product detector of the structure shown in FIGURE 6, or the optical product detector of FIGURE 7. The output of the converter 11 is the output of the optical receiver. Whenever the optical delay 34, or any other form of interferometric filtering, is omitted between the receiver input and the converter 11, the outputs of channels *a* and *b* are identical. In this case the optical product detector, serving as the converter 11, may be replaced by a photodetector upon which the receiver input is directly impinged. This is the very elementary situation of the optical receiver being in its entirety an ordinary photodetector.

The last class of optical receivers consists of those receivers, without a local optical oscillator, which simply use a photodetector as the required optical-to-electric converter. To achieve these receivers the optical beams in channels *a* and *b* of the receivers of FIGURES 20, 21, and 22 are in each case combined in a beam adder 25, the output of which is led directly to a new output channel *e* of the processor 10. The output of the channel *e* is led directly to the converter 11 which is now specifically a photodetector. The output of the converter 11 is directly connected to the circuit 12, and in each case the remaining elements are identical to and connected in the same manner as the corresponding elements of the receivers of FIGURES 20, 21 and 22. The resulting new receivers are respectively illustrated by FIGURES 23, 24, and 25, the receivers of FIGURES 23 and 24 being realizations of the general receiver of FIGURE 1 and the receiver of FIGURE 25 being a realization of the general receiver of FIGURE 3.

By omitting the phase-locking circuit 12, but still providing a local microwave signal to drive the electro-optical modulator, each of the receivers shown in FIGURES 23 and 24 becomes a receiver for detecting the microwave subcarrier as a discrete spectral component at a difference frequency in the output of the converter 11. These modified receivers, which are counterparts to the receivers shown in FIGURES 23 and 24, are specific realizations of the general optical receiver illustrated in FIGURE 2, with a photodetector as the optical-to-electric converter.

The invention herein shown and described is capable of substantial modification, by persons skilled in the art, by changing the arrangement of parts, adding to or subtracting therefrom, without departing from the spirit and intent thereof or from the scope of the appended claims.

What is claimed is:

1. A circuit for an optical receiver which detects a microwave subcarrier as a discrete spectral component at a low difference frequency in the output of said optical receiver, the inputs to said optical receiver being a microwave signal and an optical carrier with said microwave subcarrier, comprising an input channel for receiving said optical carrier, an electro-optical modulator directly connected to said input channel and thereby receiving said optical carrier, said microwave signal being directly led to said electro-optical modulator to provide modulation of said optical carrier by said microwave signal, a beam splitter directly receiving the output of said electro-optical modulator to produce first and second optical beams, wherein means for interferometric filtering by variation of optical path lengths are provided for said first and second optical beams independently and for said first optical beam relative to said second optical beam, and an optical product detector with first and second input channels into which are led, respectively, said first and second optical beams to produce an electrical signal which is the output of said optical receiver, said optical product detector being capable of producing an electrical signal whose frequency spectrum contains the low frequency components of the spectrum of the product of said first and second optical beams, and thereby containing a discrete spectral component at said difference frequency which is the difference of the frequencies of said microwave subcarrier and said microwave signal.

2. A circuit for an optical receiver which detects a microwave subcarrier as a discrete spectral component at a low difference frequency in the output of said optical receiver, the inputs to said optical receiver being a mircowave signal and an optical carrier with said microwave subcarrier, comprising an optical product detector as described in claim 1, an input channel for receiving said optical carrier, a beam splitter directly connected to said input channel and thereby receiving said optical carrier to produce a first optical beam and a third optical beam, said third optical beam being received by an electro-optical modulator to which is directly led said microwave signal to produce a second optical beam which is modulated by said microwave signal, wherein means for interferometric filtering by variation of optical path lengths are provided for said first optical beam and the combination of said third and second optical beams independently and for said first optical beam relative to the combination of said third and second optical beams, said first and second optical beams being led, respectively, to the first and second input channels of said optical product detector to produce an electrical signal which is the output of said optical receiver.

3. A circuit for an optical receiver which detects a microwave subcarrier as a discrete spectral component at the frequency of said microwave subcarrier in the output of said optical receiver, the input to said optical receiver being an optical carrier with said microwave subcarrier, comprising an input channel for receiving said optical carrier, a beam splitter directly connected to said input channel and thereby receiving said optical carrier to produce first and second optical beams, wherein means for interferometric filtering by variation of optical path lengths are provided for said first and second optical beams independently, and for said first optical beam relative to said second optical beam, an optical product detector with first and second input channels into which are led, respectively, said first and second optical beams to produce an electrical signal which is the output of said optical receiver, said optical product detector being capable of producing an electrical signal whose frequency spectrum contains the low frequency components of the spectrum of the product of said first and second optical beams, thereby containing a discrete spectral component at the frequency of said microwave subcarrier.

References Cited

UNITED STATES PATENTS

| | | | |
|---|---|---|---|
| 3,127,517 | 3/1964 | Kestenbaum | 250—220 |
| 3,163,823 | 12/1964 | Kellis et al. | 325—421 |
| 3,191,047 | 6/1965 | Oliver | 250—220 |
| 3,217,259 | 11/1965 | Kotzebue et al. | 325—421 |
| 3,231,741 | 1/1966 | Siegman | 250—199 |
| 3,231,742 | 1/1966 | Siegman | 250—199 |

DAVID G. REDINBAUGH, *Primary Examiner.*

JOHN W. CALDWELL, *Examiner.*